United States Patent
Meyers et al.

(10) Patent No.: US 6,708,228 B1
(45) Date of Patent: Mar. 16, 2004

(54) AUTOMATIC COMPUTER INPUT DEVICE ASSOCIATION

(75) Inventors: Brian R. Meyers, Bellevue, WA (US); Stephen C. Harris, Bellevue, WA (US); Barry L. Brumitt, Redmond, WA (US); John C. Krumm, Redmond, WA (US); Steven A. N. Shafer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 09/709,678

(22) Filed: Nov. 9, 2000

(51) Int. Cl.[7] ................................................. G06F 3/00
(52) U.S. Cl. ............................... 710/5; 710/33; 710/38; 709/217
(58) Field of Search ............................. 710/5, 33, 38; 709/217

(56) References Cited

U.S. PATENT DOCUMENTS 5,864,738 A * 1/1999 Kessler et al. ............... 709/239
2002/0091850 A1 * 7/2002 Perholtz et al. ............. 709/231

OTHER PUBLICATIONS

Gilber, Jill, pcAnywhere For Dummie, 2000, Hungry Minds, pp. 1–310.*

* cited by examiner

*Primary Examiner*—Jeffrey Gaffin
*Assistant Examiner*—Justin Knapp
(74) *Attorney, Agent, or Firm*—Lyon & Harr, LLP; Richard T. Lyon

(57) ABSTRACT

A system and process for automatically initiating and terminating associations between a computer input device of some type (e.g., computer mice, keyboards, trackballs, and the like) and a computer in a computing space that can have many such devices and several computers. In this way, input devices can be used to interface with any of the computers in the space. For instance, a user could move about a room filled with computers and their respective computer monitors, with a wireless mouse, and interface with the various computers using the mouse. To this end, the aforementioned association entails redirecting signals generated by a computer input device from one computing device in a computing space to another computing device in the space. The association is either initiated or terminated depending on whether sets of preconditions have been satisfied. These preconditions can be tied to any event or combination of events desired, and a set of preconditions can include any number of preconditions, even just one. In general, the preconditions will fall in two categories—namely proximity-related preconditions and nonproximity-related preconditions. Proximity-related initiating preconditions as the name implies involve a requirement that the input devices are relatively near a computer or a display device connected to the computer for an association to be initiated. Conversely, if the input device and computer are too far apart, proximity-related terminating preconditions would dictate that any association be terminated. Nonproximity-related preconditions can concern such things as ambient conditions (e.g., illumination), device states, pre-existing associations, and device incompatibility.

75 Claims, 7 Drawing Sheets

# AUTOMATIC COMPUTER INPUT DEVICE ASSOCIATION

BACKGROUND

1. Technical Field

The invention is related to automatic computer input device association, and more particularly to a system and process for redirecting signals generated by a computer input device from one computing device in a computing space to another computing device in the space.

2. Background Art

Ubiquitous computing revolves around extending computational activities beyond the current desktop model and into the environment. In future homes and offices, access to computing should be as natural as access to lighting. Users should not be required to go to a special place (i.e., the desktop) to interact with the computer. Rather, the computer should be available to interface with the user anywhere in the home or office (or more generally anywhere in an arbitrarily large computing space), through whatever set of devices is available, be they fixed or carried by the user.

It is noted that the term computer is used loosely here in that the user actually would have access to a wide variety of computing devices such as personal computers, server computers, hand-held or laptop devices, multiprocessor systems, microprocessor-based systems, set top boxes, programmable consumer electronics, network PCs, minicomputers, mainframe computers, and the like, as well as distributed computing environments that include any of the above systems or devices. Thus, it should be understood that when the term computer is used in connection with the concept of ubiquitous computing, in actuality a wide variety of computing devices and schemes may be involved.

One particular issue of concern in ubiquitous computing is the common scenario of a room filled with computers along with their various input devices, such as computer mice, keyboards, trackballs, and the like, as well as display devices like a computer monitor. In a traditional setting, an input device would be used to interface with a nearby computer and its monitor, and no other computers in the room. However, people often associate the proximity of devices with their working together. For instance, it is usually expected that the light switches in a room control the lights in the room, and that remote controls in the room work the remotely controllable devices in the room. Part of the vision of ubiquitous computing is to have devices behave as they should when they are near each other. For instance, a computer mouse used near a certain computer monitor should control the cursor on that monitor. Thus, ideally, in an ubiquitous computing environment a user would expect that the input devices would work with whatever computer display device they are near. This is particularly true for mobile input devices such as wireless keyboards and computer mice that are intended to be moved freely from place to place. Further, a user might also expect this behavior to be modulated by other factors, like their personal preferences, the ambient conditions in the room, the compatibility of the input devices with the computers, and so on.

SUMMARY

The present invention addresses the foregoing issues with a system and process for automatically initiating and terminating associations between a computer input device of some type (e.g., computer mice, keyboards, trackballs, and the like) and a computer in a computing space that can have many such devices and several computers. In this way, input devices can be used to interface with any of the computers in the space. For instance, a user could move about a room filled with computers and their respective computer monitors, with a wireless mouse, and interface with the various computers using the mouse. However, it is noted that the input devices need not be "wireless" to be associated with other computers in a computing space. In fact, associations can actually contradict hardware connections. For instance, a keyboard wired to a certain computer does not need to have its keystrokes sent to that computer, rather they could be sent to any computer in the space.

The aforementioned association between input devices and computers in a computing space entails redirecting signals generated by a computer input device from one computer to another computer in the space. The association is either initiated or terminated depending on whether sets of pre-defined preconditions have been satisfied. It is noted that each of the input devices is physically connected to one of the computers in the space. This connection implies that the signals generated by the input device would nominally be routed to an input queue of the assignee computer, barring any re-routing of the signal as will be discussed next. For the purposes of the following description, an input device that is connected to a computer in the computing space will be referred to as being assigned to that computer.

To accomplish the desired re-routing of the input device signals, the following architecture and input signal interception/routing processes can be employed to link the input devices and computers residing in the computing space. Each of the computers in the computing space that has an input device connected to it would include at least one input device output path or "source". This output path by-passes the nominal input queue of the computer and directs the signal out of the computer. In addition, each computer in the computing space that it is desired for an input device assigned to another computer to interface with, includes at least one alternate input device input path or "sink.". This sink is capable of accepting input device signals that are output from a source on the assignee computer and routing them to another computer's input queue. Only signals routed from other computers would be input through the aforementioned alternate input paths. The input device output paths and alternate input device input paths can enter and leave the computers via specialized plugs, a network connection, or any other workable inlet or outlet, whether physical or virtual. Sources and sinks can be directly connected, or as in tested embodiments of the present invention linked via a network. The aforementioned processes for intercepting and routing input device signals is preferably handled by one or more computer programs resident on the various computers in the computing space.

It is noted that the computer receiving input device signals from an input device assigned to another computer may also be an assignee computer with its own assigned input devices. These devices would interface with the computer through its standard input device inputs, and could be either wired or wireless.

The foregoing architecture and intercepting/routing processes allow for the signals generated by any input device in the computing space to be routed to any computer in the space. However, there must also be a vehicle for controlling the re-routing process. This role is taken by at least one computer program resident in one or more of the computers in the space. The program first determines whether a set of prescribed initiating preconditions for rerouting the input device signals from an assignee computer to another of the computers in the space have been satisfied. Whenever the initiating preconditions are satisfied, the input device signals are rerouted using the previously-described architecture away from the input queue of the assignee computer to the input device output path of that computer instead. In addition, the input device signals from a source on the assignee computer are routed to the sink of another computer in the space, where they are finally routed by the other computer to its input queue. Thus, the input device would interface with the other computer just as if it were assigned to that computer.

As indicated above, the decision as to whether an input device is to be associated with a non-assignee computer depends on satisfying a set of preconditions. In addition, the decision as to whether an existing association is terminated depends on satisfying one or more of a set of terminating preconditions. These preconditions can be tied to any event or combination of events desired, and a set of preconditions can include any number of preconditions, even just one. Furthermore, the preconditions may include a direct user request for a particular routing. For example, a precondition may be established such that a user selection such as a click of wireless mouse or selection of some other user interface input would initiate or terminate an association. In general, the preconditions will fall in two categories—namely proximity-related preconditions and nonproximity-related preconditions.

Proximity-related initiating preconditions as the name implies involve a requirement that the input devices be relatively near a computer, or a display device connected to the computer, for an association to be initiated. Conversely, if the input device and computer are too far apart, proximity-related terminating preconditions would dictate that any association be terminated. Examples of proximity-related preconditions include an initiating precondition that an input device be within a prescribed distance from a non-assignee computer or its display device (e.g., computer monitor), and a companion terminating precondition that would terminate the association if the input device and computer are separated by some prescribed distance. In addition there may be other proximity-based preconditions, for example that the line of sight between the input device and a display device of a non-assignee computer be unobstructed to the degree that a person using the input device can see the display device. Here, the companion terminating precondition would be that this line of sight becomes blocked. Other proximity-based preconditions include an initiating precondition that no computer or display device in the computing space be closer to the input device than computer or display device under consideration for association with an input device. This would have a companion terminating precondition that the associated computer or display device remains the closest to the input device. It is noted that the simple separation distance precondition described above may not suffice in some circumstances. For example, suppose a wireless keyboard is very near a monitor, but behind it so that a person using the keyboard could not see the display screen of the monitor. In such a case an association should not be made between the keyboard and the computer to which the monitor is connected. This problem can be resolved by defining a service area for the input and display devices. For a display device such as a computer monitor, the service area is the region in the computing space in which the display screen of the device can be seen by a user given the orientation of the display screen. Similarly, the service area of an input device such as a wireless mouse or keyboard might be its maximum range of operation. An example of an initiating precondition related to the input device service area is that the other computer be located within the service area defined for the input device. The companion terminating precondition would of course be that the other computer is outside the input device's service area. Another example of a precondition related to service areas is an initiating precondition requiring that an input and display device be located within each other's service area. The corresponding termination condition for this example would be that either the input or display device moves outside the other's service area. It is also noted that the size of the service area defined for the input and display devices need not be the same in connection with the initiating preconditions compared to terminating preconditions. Particularly, the service areas connected with the terminating preconditions could be larger than those used for the initiating preconditions. This would be useful, for example, where it is desired that an input device be relatively close to a display device before the input device is associated with the computer to which the display device is connected, but where it is desired that the association not be terminated unless the input device is taken further away from the display than the initiating distance.

Examples of nonproximity-related preconditions include an initiating precondition that at least one ambient condition in the computing space fall within a prescribed range, and a terminating precondition that an ambient condition falls outside the prescribed range. For example, a precondition could required that an association only be initiated if the illumination within the space exceed a level that would allow a person in the space to see and operate the input device. The corresponding terminating precondition for this would require the association to be terminated if the illumination level fell below the prescribed level. Another example of a nonproximity-based precondition involves the state of the input devices, the computers and any display devices in the computing space. Essentially, initiating preconditions would require that an input device, computer and possible a display device connected to the computer being considered for association, be in their ready states. The corresponding terminating precondition would require the association to be terminated if the input device, computer, or the display device, go offline. Additional examples of a nonproximity-based preconditions include an initiating precondition that would preclude an input device from being of a particular configuration whose signals are incompatible for input to the computer being associated with the input device, or an initiating precondition that no other input device of the type under consideration can have its signals redirected to the other computer. There is no companion terminating precondition for the first of these examples since an incompatible device will never be associated. However, in the case of the pre-existing association, it might be desired to allow the new association to take place, while the existing association is terminated. In such a case a terminating precondition for a particular association between an input device and a computer in the computing space could require that the association be terminated if another association is initiated between a different input device and the same computer.

In addition to the foregoing types of preconditions, an initiating or terminating precondition could be based on a user specified preference, rather than applying to all users in a global fashion. User preference preconditions could be either proximity or nonproximity related. Additionally, as noted above, the user could directly request a particular routing through an appropriate user interface. For example, the user could request that the current keyboard and mouse which they are using be routed to a different computer. This would allow them to control that other computer. In a room with multiple displays connected to different computers, this is a useful capability. Both initiating and terminating preconditions could depend on direct user input.

In general, preconditions for initiation or termination can be expressed in formal logic, allowing any precondition to be a logical combination of other preconditions, be they proximity-based, non-proximity based, or directly commanded. For example, a keyboard might become associated with a particular display if 1) the keyboard is in the service area of the display (proximity) and 2) the keyboard is not owned by any user (non-proximate) and 3) a user indicates through some UI that it is desired for the keyboard to become associated (direct-command).

The aforementioned computer programs that control the re-routing process must obtain information about the computing space in order to determine if the initiating and terminating preconditions have been satisfied. This is preferably done by inputting the needed information from one or more databases. These databases would be maintained so as to reflect the most current information available. For example, there would preferably be a geometry database containing information concerning the geometry of the computing space and the locations in the computing space of the input devices and computers, as well as any display devices of interest. Another useful database would be a device state database that contains information concerning the readiness of the input devices, computers and display devices in the computing space. If there are preconditions involving the ambient conditions in the computing space, one of the databases could be an ambient conditions database containing information concerning the ambient conditions in the computing space that are relevant to any of the initiating and terminating preconditions. Finally, there could be a user preference database containing the current user preferences that are relevant to the initiating and terminating preconditions.

In practice, the needed information about the computing space could be obtained by requiring the various databases to periodically output the information. This could be done on a prescribed schedule, or whenever new or updated information is obtained by a database. Alternately, the computer program could be designed to periodically request the needed information and input the results.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 1:
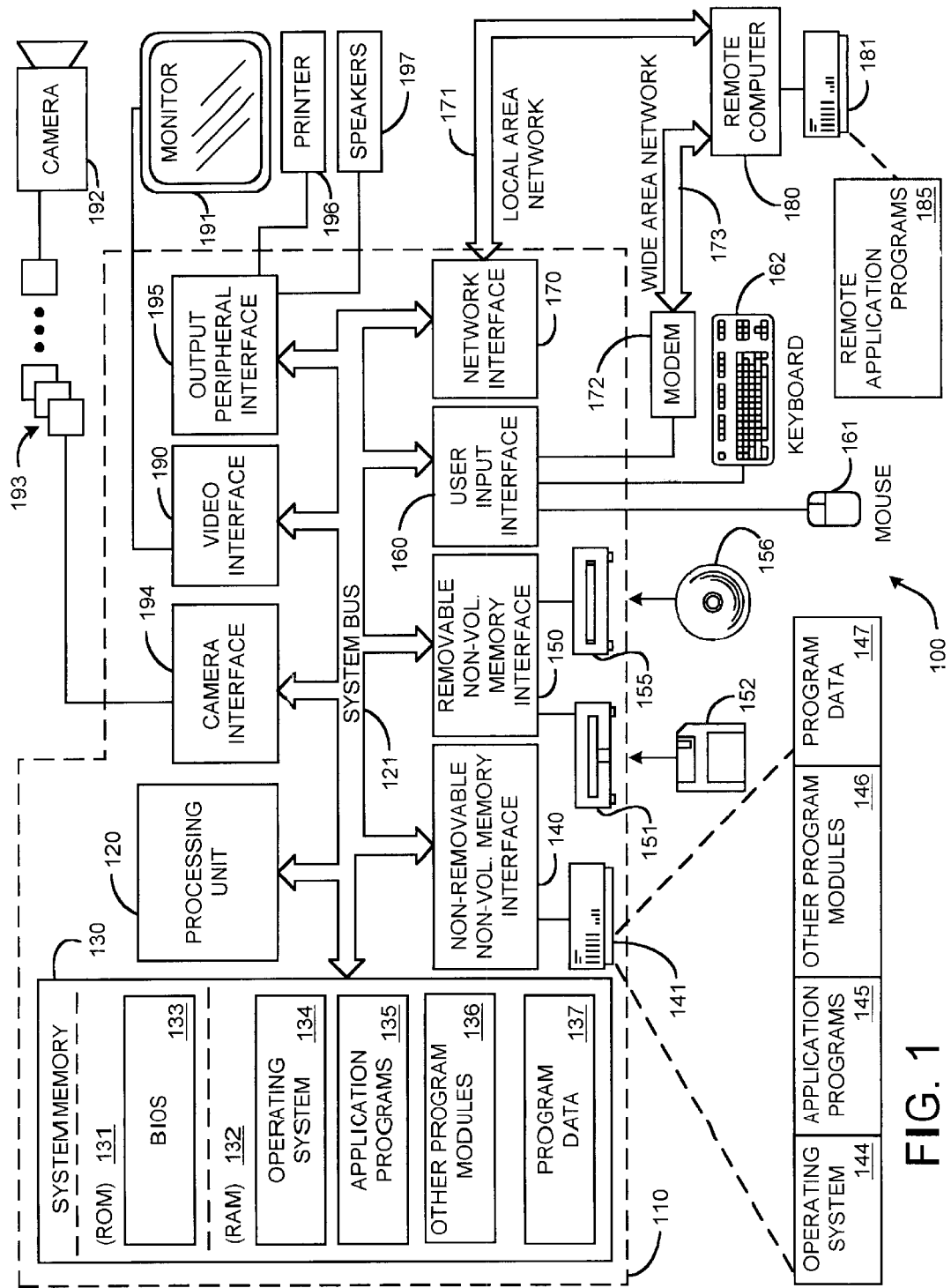
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the system and process embodying the invention. Generally, the present invention involves automatically effecting associations between a computer input device of some type and a computer. For the purposes of this description, effecting an association between an input device and a computer refers to at a minimum initiating a communication link between the devices, but may also include terminating an initiated communication link as well. The aforementioned association is initiated or terminated depending on whether sets of predefined preconditions have been satisfied. To accomplish these tasks, the present system and process includes a capability to redirect input device signals from one computer to another, as well as a capacity for making a decision on when this redirection will occur. These two major aspects of the present system and process will be discussed in detail in the sections to follow.

1.0 Architecture for Redirecting Input Device Signals

As discussed previously, it is not uncommon to find a multitude of computers, which could be in the form of a PC, laptop computer, palmtop computer, and the like, scattered throughout a space such as a room or work area. Each of these computers would be capable of accepting inputs from a computer input device such as a keyboard, computer mouse, trackball, or the like. While these input devices could be of the wired type which are physically connected to a computer, the present invention is particularly advantageous when employed with wireless versions of these input devices, as will become evident in the following description. In addition, many, if not all, of these computers would have a display device such as a computer monitor connected to it for displaying images and information to a user.

In the context of the present invention, a user in the above-described computing space would expect the various input devices to be able to interface with any of the computers with displays such that the results of operating the input device is acknowledged in some way by the display device. For instance, a user typing on a keyboard in the vicinity of a computer monitor would want the results, such as typed text, to appear on the display screen. Or a user may want to bring a computer mouse in the vicinity of a monitor and expect to be able to move a cursor around the display screen and select items using the mouse. Further, it would benefit the user if some associations were made automatically without any intervention on the user's part to initiate the communication between the devices.

Figure 2:
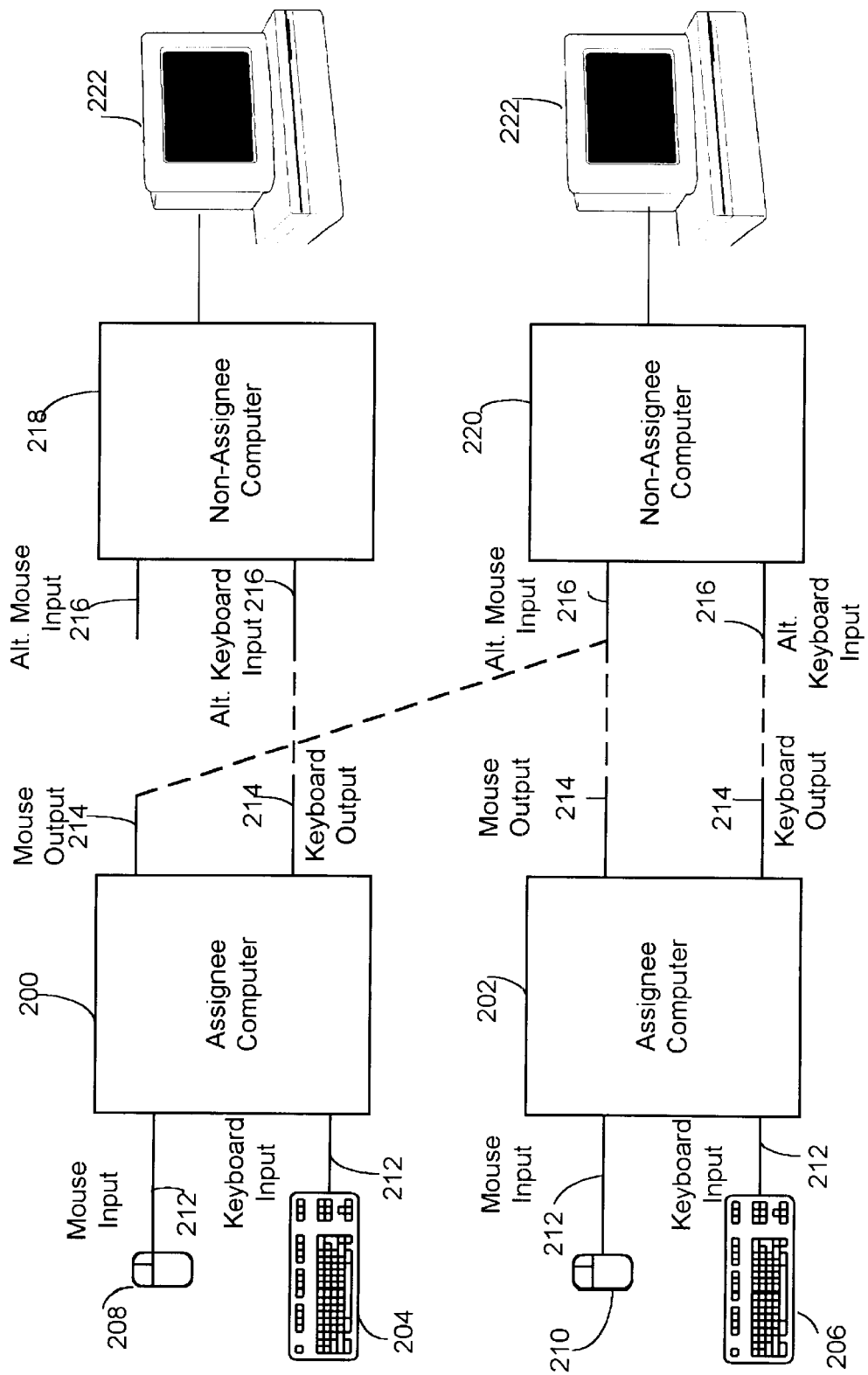
FIG. 2 is a diagram exemplifying an architecture for redirecting signals generated by a computer input device from one computer in a computing space to another computer in the space.

The block diagram of FIG. 2 presents a general way in which the various interfaces between the various input devices and computers in the computing space can be achieved using both physical connections and software. It is noted that the diagram of FIG. 2 is simplified and is merely designed to exemplify the various possible interfaces between input devices and computers in the space. The computing space will contain at least one input device such as a keyboard or computer mouse, each of which is assigned to one of the computers in the computer space. In FIG. 2, there is a separate keyboard 204, 206 assigned to each of two different computers 200, 202, respectively. Likewise, there is a separate mouse 208, 210 respectively assigned to each of the same two computers 200, 202. The nature of this assignment will be discussed shortly. The actual connection between the keyboard 204, 206 or mouse 208, 210, and the respective computers 200, 202 to which they are assigned may be wired or wireless. In regard to wireless input devices such as computer mice and keyboard, these device typically employ radio frequency (RF) or infrared (IR) signals to communicate with nearby computers. The aforementioned connections are shown schematically in FIG. 2 by the solid device input lines 212 connecting the keyboards 204, 206 and computer mice 208, 210 to their respective computers 200, 202.

Each of the computers 200, 202 with an assigned keyboard 204, 206 or mouse 208, 210 intercepts the normal flow of input device signals. These signals can be passed onto their normal input queue, in which case the computer would act normally. Thus, for example, if it is desired that the results of typing on the keyboard or manipulating a mouse assigned to a particular computer be reflected on the display device connected to that computer, the input device signals would be directed in the normal manner to the input queue of the computer. However, alternately, the signals can instead be directed onto separate input device output paths 214 represented in FIG. 2 by the respective solid lines labeled keyboard and mouse outputs that emanate from the computers 200, 202 having assigned input devices. In tested embodiments of the present invention, these output paths physically took the form of a normal TCP/IP Ethernet network. However, any workable transport path can be used to output the re-routed input device signal, as long as the signals can ultimately be input into the other computers residing in the computing space. This input into the other computers in the space is represented in FIG. 2 by the alternate input device input paths 216 depicted as the respective solid lines labeled alternate mouse and keyboard inputs that fed into the computers 218, 220. The alternate input paths 216 can physically correspond to specialized plugs on the back of the computer 218, 220, a standard network input line, or any other workable input to the computer. The signals input into a computer 218, 220 via an alternate input path 216 would be identified and routed as appropriate to the computer's normal input queue. The computers 218, 220 are shown with connected display devices 222 in the form of the aforementioned computer monitors.

The foregoing description stated that an input device in the form of a keyboard 204, 206 and mouse 208, 210 was assigned to each of two of the depicted computers 200, 202, and connected thereto via input lines 212. The significance of this assignment is that the signals from an input device are routed to the normal input queue of the computer to which it is assigned, unless a set of preconditions is satisfied that would indicate the input device is to be associated with another of the computers in the computing space. If the preconditions for initiating an association between an input device and another computer are satisfied, the signals from the input device are routed to the other computer via an input device output path 214 of the first computer to an alternate input path 216 of the other computer. Thus, an input device output path is a "source" for signals from this device. An alternate input device input path is a "sink", which takes signals from a source and routes them to the normal input queue for that class of device on that computer.

Sever variations of this are depicted in FIG. 2 by the dashed lines connecting the output paths 214 of computers 200, 202 to the alternate input paths 216 of computers 218, 220. For example, the output path 214 labeled keyboard output on computer 200 is connected by a dashed line to the alternate input path 216 labeled alternate keyboard input of computer 218. In other words, 214 is a source, and 216 is a sink. This indicates that the signal from the keyboard 204 is re-routed from computer 200 to computer 218 where it is provided to that computer's normal input queue. Thereafter, the results of the user typing on the keyboard 202 would be reflected as appropriate on the display device 222 connected to that computer. A similar rerouting of the signals output by keyboard 206 from computer 202 to computer 220 is also illustrated as are the signals output from mouse 210. An interesting variation of the input device rerouting is illustrated by the rerouting of the signals of mouse 208 from computer 200 to computer 220. The rerouting is interesting in that the signals from more than one input device (sources) are shown being input into one of the alternate input paths (sinks) 216 of computer 220. Specifically, the signals from both mouse 208 and mouse 210 are routed to the alternate input path 216 labeled "alternate mouse input" of computer 220. This points out that signals from multiple similar input devices can be routed to a single computer. The signals from the multiple input devices could all be routed to the computer's input queue, or one or more of the signals could be ignored. This aspect of the present system and process will be discussed in greater detail in the next section.

It is noted that four computers 200, 202, 218, 220 have been shown in FIG. 2. This was done for the convenience of describing the computing space architecture and for explaining the associating process that is to follow. There could be fewer than four, or more than four computers in the actual computing space. Further, while FIG. 2 shows computers 200, 202 as having a keyboard 204, 206 and mouse 208, 210 assigned thereto, along with standard input lines 212 for inputting signals from these devices and output paths 214 for outputting the signals, these features can also be present in the other computers in the computing space, such as the illustrated computers 218, 220. Similarly, while computers 218, 220 are shown with the alternate input paths 216 and connected display devices, these elements can also exist in the other computers in the computing environment, such as the illustrated computers 200, 202. These missing items in FIG. 2 were simply omitted to keep the diagram uncluttered so as to facilitate the description of the computing space setup.

The above-described process of intercepting input device signals and routing them based on whether a set of preconditions is satisfied was implemented in the following manner in tested embodiments of the present invention. A normal computer has a hardware bus to handle input from the mouse and keyboard. There are several existing processes that allow this bus to be redirected between computers. These processes perform a redirection on the connection between the devices (e.g., 161, 162 of FIG. 1) and the input interface (e.g., 160 of FIG. 1). The present system and process, in contrast, employs a software program that virtualizes the input stream. When the Operating System of a computer (e.g., 134 of FIG. 1) gets the input device commands from the User input interface of the computer (e.g., 160 of FIG. 1), they are intercepted. In the tested embodiments of the present system and method, the program that performs this interception is functionally the Source, as defined above. The data captured from the input devices can be routed via a network interface (e.g., 170 of FIG. 1), or possibly some other bus, to a program called the Sink. The Sink is a software program responsible for converting the commands received from the network (or other) bus back into something the operating system understands. This causes them to appear as if they came from the User input interface. Each Source can be directed to zero or more Sinks. The target Sink can be on the same computer or on a different computer. Each Sink can accept input from zero or more Sources. The Source can be on the same computer or different computer. In the foregoing general description of the present system and process, the Source corresponds to the input device output path of the Assignee computer, and the Sink corresponds to the alternate input device input path of the other or "non-assignee" computer.

Both the Sources and the Sinks have a command channel that allows a third program, referred to as an Input Router Program, to control them. These commands cause the Sources to direct their output to various Sinks and cause the Sinks to accept or reject input from various Sources. Given a collection of Sources and Sinks, an Input Router Program is used to control the connections between Sources and Sinks. Any information can be used to decide how to make and break the Source-Sink connections, as will be discussed later. Basically, any combination of anything the system can model can also be used to control the connection between a Source and Sink.

2.0 Automatic Redirection of Input Device Signals

The above-described architecture of the computing space is employed in a process for automatically redirecting input device signals contingent on the satisfaction of certain associating preconditions, as described. This process (which can correspond to an aforementioned Input Router Program) is generally implemented as shown in the high-level flow diagram of FIG. 3 by first establishing, for each different type of input device, a set of initiating preconditions specifying the circumstances under which an association is to be initiated between that type of input device and a remote computer (process action 300). The term remote computer refers to a computer other than one to which the input device under consideration has been assigned. The computing space is then monitored (process action 302), and at some point in time it is determined whether the initiating preconditions established for each of the input device types have been satisfied between a particular input device of that type and a particular remote computer in the space (process action 304). If it is determined that the initiating preconditions established for an input device type has been satisfied, an association is initiated between the particular device and remote computer involved (process action 306). Once the appropriate association or associations are initiated, or when the initiating preconditions are not satisfied by any particular device belonging to the identified computing device type, process actions 302 through 306 are repeated for as long as it is desired to automatically initiate the aforementioned associations. It is noted that the points in time that it is determined whether the initiating preconditions established for each of the computing device types have been satisfied, can occur at a prescribed time interval, or alternately, when new information concerning the device type is received. These options will be discussed in length later in this description.

Figure 4:
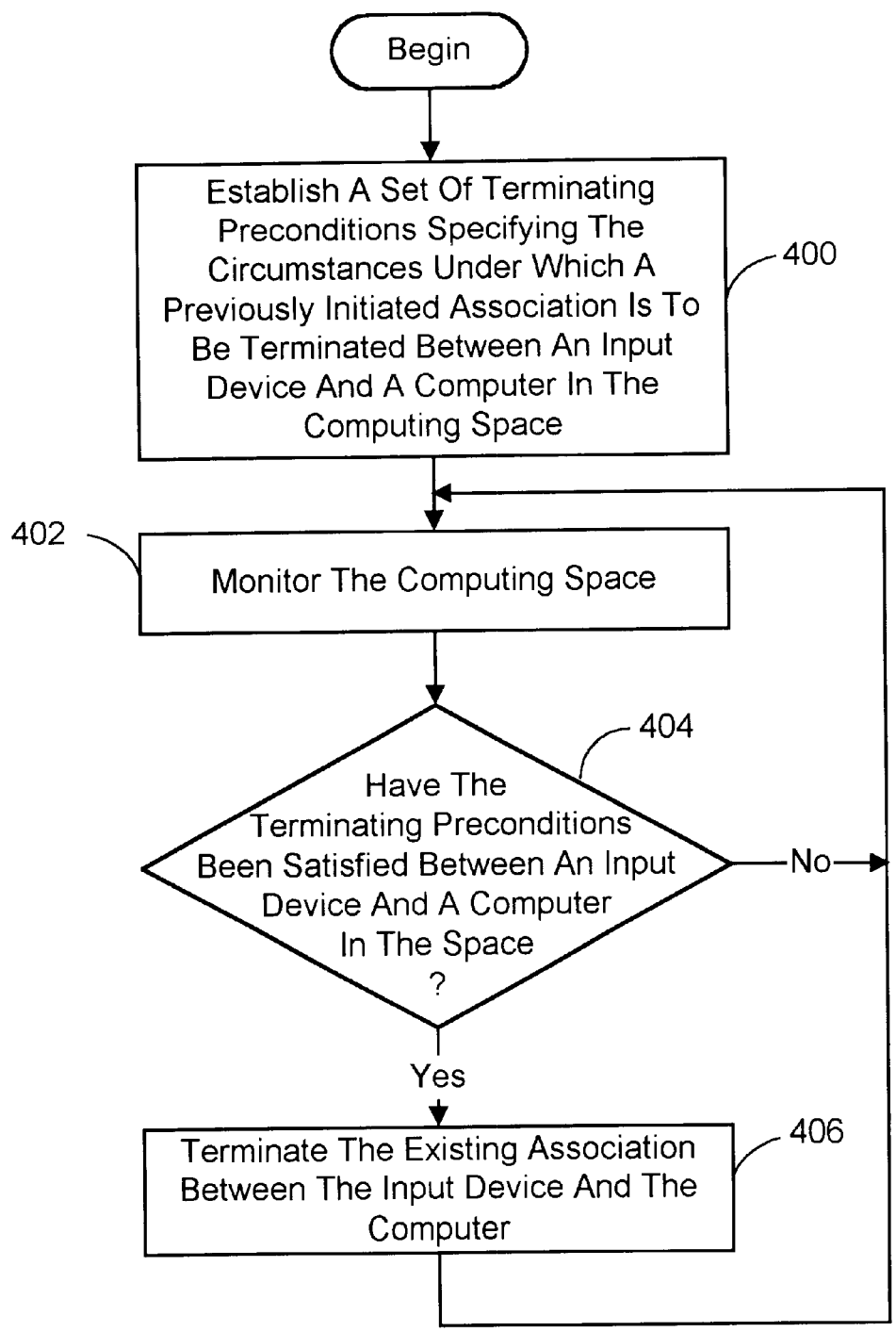
FIG. 4 is a flow chart diagramming an overall process for terminating a previously existing association between an input device and a computer in a computing space in accordance with the present invention.

The process is preferably also employed to automatically terminate a previously initiated association between an input device and a remote computer, as outlined in the flow diagram of FIG. 4. This process is generally implemented by establishing, for each different type of input device, a set of terminating preconditions specifying the circumstances under which a previously initiated association is to be terminated between that type of input device and a remote computer (process action 400). Here again, the computing space is monitored (process action 402), and at some point in time it is determined whether the terminating preconditions established for each of the input device types have been satisfied between a particular input device of that type and a particular remote computer in the space (process action 404). It is noted that satisfying the terminating preconditions may only require that one of a set of preconditions be satisfied. If it is determined that the terminating preconditions established for an input device type has been satisfied, the existing association between the particular device and remote computer involved is terminated (process action 406). Once the appropriate association or associations are terminated, or when the terminating preconditions are not satisfied by any particular device belonging to the identified computing device type, process actions 402 through 406 are repeated for as long as it is desired to automatically terminate the aforementioned associations. It is noted that here again the points in time that it is determined whether the terminating preconditions established for each of the computing device types have been satisfied, can occur at a prescribed time interval, or alternately, when new information concerning the device type is received.

2.1 Establishing a Set of Initiating and Terminating Preconditions

In regard to the process action of the general processes for automatically redirecting input device signals involving establishing a set of initiating and terminating preconditions for each different type of input device, these preconditions can be tied to any event or logical combination of events desired. A precondition involving a logical combination of events employs first order predicate logic, in it is a logical statement which consists of preconditions combined using AND, OR, EXCLUSIVE OR, NOT, and specified using universal and existential quantifiers. The set of preconditions can include any number of preconditions, or only one if desired. In general, the preconditions will fall in two categories—namely proximity-related preconditions and nonproximity-related preconditions.

Proximity-related preconditions as the name implies typically involve a requirement that the input devices are relatively near a computer or a display device connected to the computer for an association to be initiated. At its simplest, this might mean an input device is within a prescribed distance from the computer or display device. However, such a simple characterization may not always suffice. For example, the line of sight between an input device and a computer monitor connected to a computer being considered for association could be blocked by some object in the computing space. The user may not be able to see the monitor thus making the association of the input device and the computer to which the monitor is connected undesirable. Accordingly, in addition to a minimum separation distance precondition, there might also be a precondition that the line of sight between the two devices be clear. Further, an object might be between an input device under consideration for association with a computer and the computer, which while not blocking the line of site, would make the association undesirable. An example of this situation might be that a wireless mouse is within some minimum distance from the monitor, but another monitor is even closer, thereby indicating the user may want to have the mouse associated with the computer to which the closer monitor is connected instead. Accordingly, there might also be a precondition that the input device be associated only with the closest computer. Another circumstance where a simple separation distance precondition alone may not suffice, involves the orientation of an input device and a display device. For example, suppose a wireless keyboard is very near a monitor, but behind it. It is unlikely the user would want the mouse associated with a computer to which the monitor is connected that he or she may not be able to see. This problem can be resolved by defining a service area associated with each input and display device. For a display device such as a computer monitor, the service area could be the region in a room from which the monitor can be seen by a user given the orientation of the monitor's display screen. Similarly, the service area of an input device such as a wireless mouse or keyboard might be its maximum range of operation, should this range be smaller than the size of the room. If a service area is designated for a device, then a precondition could be established such that the other device must be within that service area in order for the association to be initiated. Or, the precondition might require that each device be in the other's service area. For example, it might be required that a wireless mouse be within the service area of a monitor that defines the region in the computing space that the screen of the monitor can be seen. In addition, it would be required that the computer to which the monitor is connected be in the service area of the wireless mouse where the mouse's service area defines its maximum range. The foregoing service area scheme would replace or supplement the more simplistic separation distance requirement to provide a more precise indication of the proximity of the input device and a display device.

While a few examples of the types of proximity-based preconditions have been described above, it is noted that there are many others as well and as such it is not intended to limited the present invention to just the elucidated examples.

Referring now to the aforementioned nonproximity-related preconditions, other factors not involving the positional relationships between an input device and a display device can have a significant impact on whether the input device should be associated with a computer in the computing space. For example, it would not be practical in most cases to associate a wireless keyboard to a computer in a dark room because the user would not be able to see the keyboard. Thus, the ambient conditions of the computing space are sometimes an issue. Other nonproximal preconditions not related to the ambient preconditions of the environment are also possible. One of these involves prescribed device preferences. For instance, it may be preferred that certain associations last forever. Thus, once initiated such an association could not be terminated. This could be accomplished by having preconditions for initiating the association, but no terminating preconditions. It might also be preferred that a certain type of input device never be associated with a computer. For example, if an input device were incompatible in some way with the computers in the computing space, it would be desirable that they not be associated. To accomplish this task, the set of initiating preconditions established for the general class of input devices including the incompatible type would include a precondition that the input device not be of the incompatible configuration for an association to be initiated. Another nonproximal precondition that can be included involves the state of the input device and computer potentially being associated, as well as the display device connected to the computer. Essentially, one or more of these units may not be in a ready state such that an association is possible. For example, suppose the computer or display device were powered down. Clearly no meaningful association could be made between the input device and the computer. Thus, a precondition for initiating an association could be that all the devices involved are in a ready state. It is noted that preconditions for terminating a previous initiated association, which will be discussed next, could include a precondition that the association be terminated if any of the devices involved are no longer in the ready state.

As with the proximity-based preconditions, a few examples of the types of nonproximity-based preconditions have been described above. However, it is noted that there are many others as well and as such it is not intended to limit the present invention to examples provided.

To this point the discussion has centered on the preconditions for initiating an association between devices. However, as mentioned previously, a set of terminating preconditions is also defined for each type of input device, which are employed to determine when a previously initiated association is to be terminated. As with the initiating preconditions, the terminating circumstances can include both proximity-based and nonproximity-based preconditions. These preconditions could simply be the reverse of some of the initiating preconditions. For example, if an initiating precondition required that the an input device and a display device be within each other's service region before the input device is associated with the computer to which the display is connected, a terminating precondition might require that the devices be out of each other's service region before the association is terminated. It is also noted that while all or most of the initiating preconditions might have to be satisfied to trigger an association, it could be that if any one (or some small number) of the terminating preconditions are satisfied the association is terminated. Further, even if a terminating precondition is generally the opposite of an initiating precondition, its specifics could vary. For example, in the foregoing example where the initiating precondition required that an input device and a display device be within each other's service region before the input device is associated with the computer to which the display is connected, and the companion terminating precondition required that the devices be out of each other's service region before the association is terminated, the size of the service regions might be different. A smaller service region could be assigned to the devices for purposes of initiating an association, than for terminating the association. Thus, effectively the devices would have to be relatively close to each other to initiate the association. This could be advantageous, especially in rooms where there are many similar input devices and display devices. However, the user could move about the room and even take the input device further away than the effective initiating distance without having the association terminated. In such a case, the service regions associated with terminating the association would be made large enough to ensure the freedom of movement but not so large that the devices would be too far away from each other to operate effectively.

Another type of nonproximity related precondition that could be employed in the set of preconditions defined to initiate or terminate an association between devices involves a direct request by a user for a particular routing of an input device. For example, the user could by his or her direct action cause the signals from a current keyboard and mouse which the user is using to be routed to a different computer than the one currently being interfaced with via these devices. Similarly, a user could terminate an existing association between an input device and a computer in the computing space by his or her direct action. Generally, such preconditions would be satisfied if a user made a selection of some sort through an input device or an appropriate user interface. For example, the precondition could be satisfied when the user makes a selection by a click of a wireless mouse or through an appropriate user interface. This feature would allow users to proactively control any computer in the computing space. In a space with multiple displays connected to different computers, this can be a very useful capability.

Yet another type of a non-proximity precondition that could be employed in the set of preconditions defined to initiate or terminate an association between devices involves pre-existing associations. As discussed previously, it is possible that more than one of the same type of input device (or devices with similar functions like pointing devices) can be associated with the same computer. For example, two different computer mice, or a trackball and mouse, could be associated with a computer and be capable of controlling the cursor on a display device connected to that computer. If this is deemed to be an unacceptable practice in the computing space, then a pre-existing association precondition could be employed. This precondition would require determining if a pre-existing association between a computer and a similar input device exists. The precondition would only be satisfied if there was no pre-existing association. Thus, if a pre-existing association was present, the initiating preconditions for associating the "new" input device would not be satisfied and no association would take place. This example concerns initiating preconditions, however, a pre-existing association could also be designed to trigger the termination of an association. For example, suppose a trackball was previously associated with a particular computer in the computing space. Now suppose that a wireless computer mouse is brought into the space and would satisfy all the initiating preconditions for associating the mouse with the aforementioned computer. However, it is prescribed that only one pointing device can be associated with a computer at one time in this hypothetical computing space, and further suppose that computer mice are the preferred pointing device. Under these circumstances, a terminating precondition for a previously associated trackball might be that whenever the initiating preconditions for associating a mouse with the computer are satisfied, the association between the trackball and the computer is terminated.

Another type of precondition, which could be either proximity or nonproximity based, is a precondition predicated on a user preference. This type of precondition, whether it was involved in initiating an association or terminating one, would allow a user to tailor the present automatic device association system and process to his or her needs. An example of a user preference precondition would be a precondition related to security. Suppose a user did not want any keyboard or mouse to be associated with a computer except specific ones he or she authorizes. Of course, this is just one example of a user preference precondition and there are many others. It is envisioned that any user preference could be assigned as a precondition for initiating or terminating an association between devices, not just the one described above.

As can be seen from the foregoing discussion of the association preconditions, each type of input device will preferably have a set of initiation and termination preconditions that are tailored to the configurations of the applicable devices and the desires of the user. These preconditions will vary greatly and while a few examples were provided, many more will exist. The important point is that the preconditions set out the circumstances in which it would be likely the user would want an input device to communicate or stop communicating with a computer in the computing space, as the case may be.

2.2 Redirection Process

Figure 3:
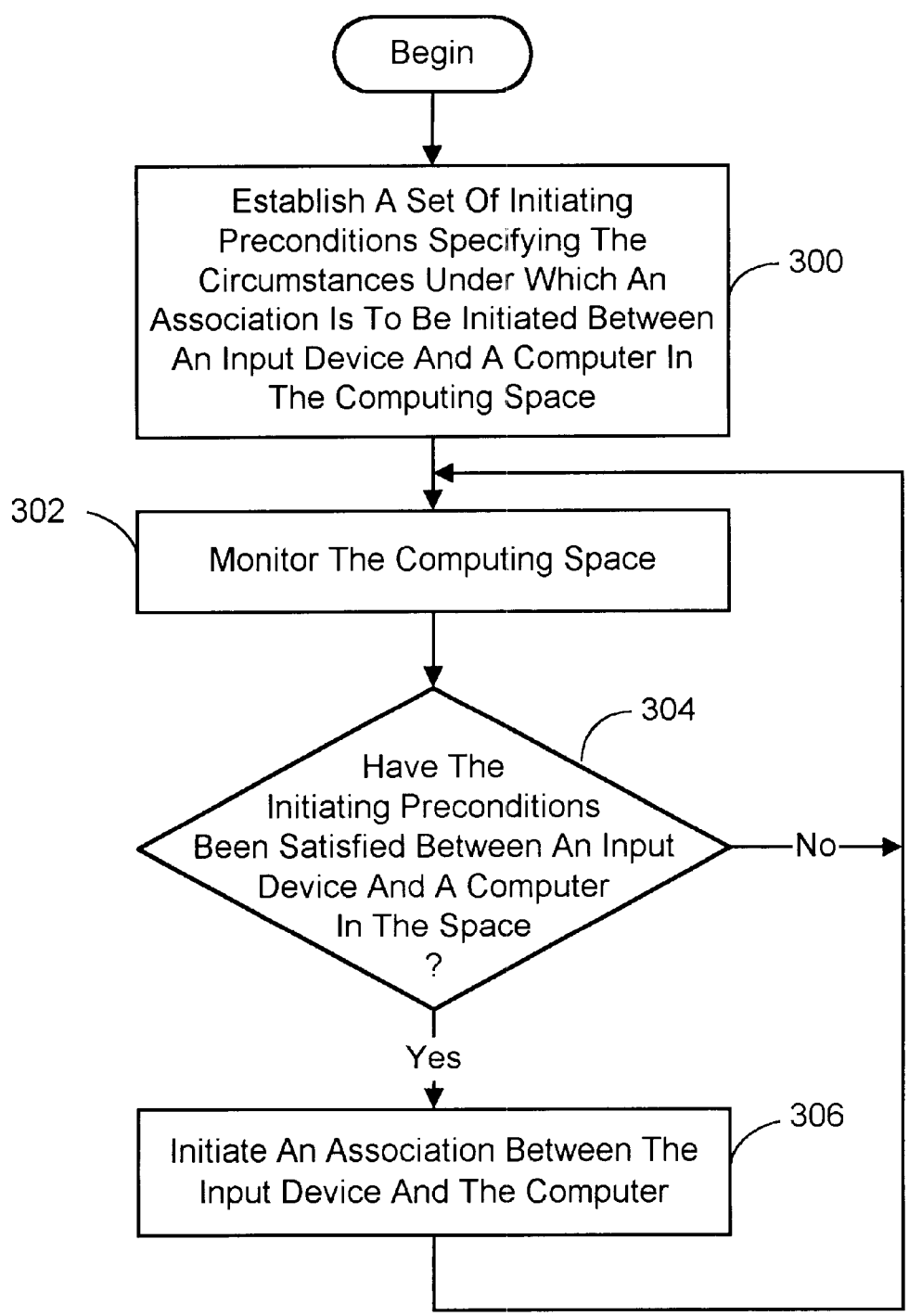
FIG. 3 is a flow chart diagramming an overall process for initiating an association between an input device and a computer in a computing space in accordance with the present invention.
Figure 5:
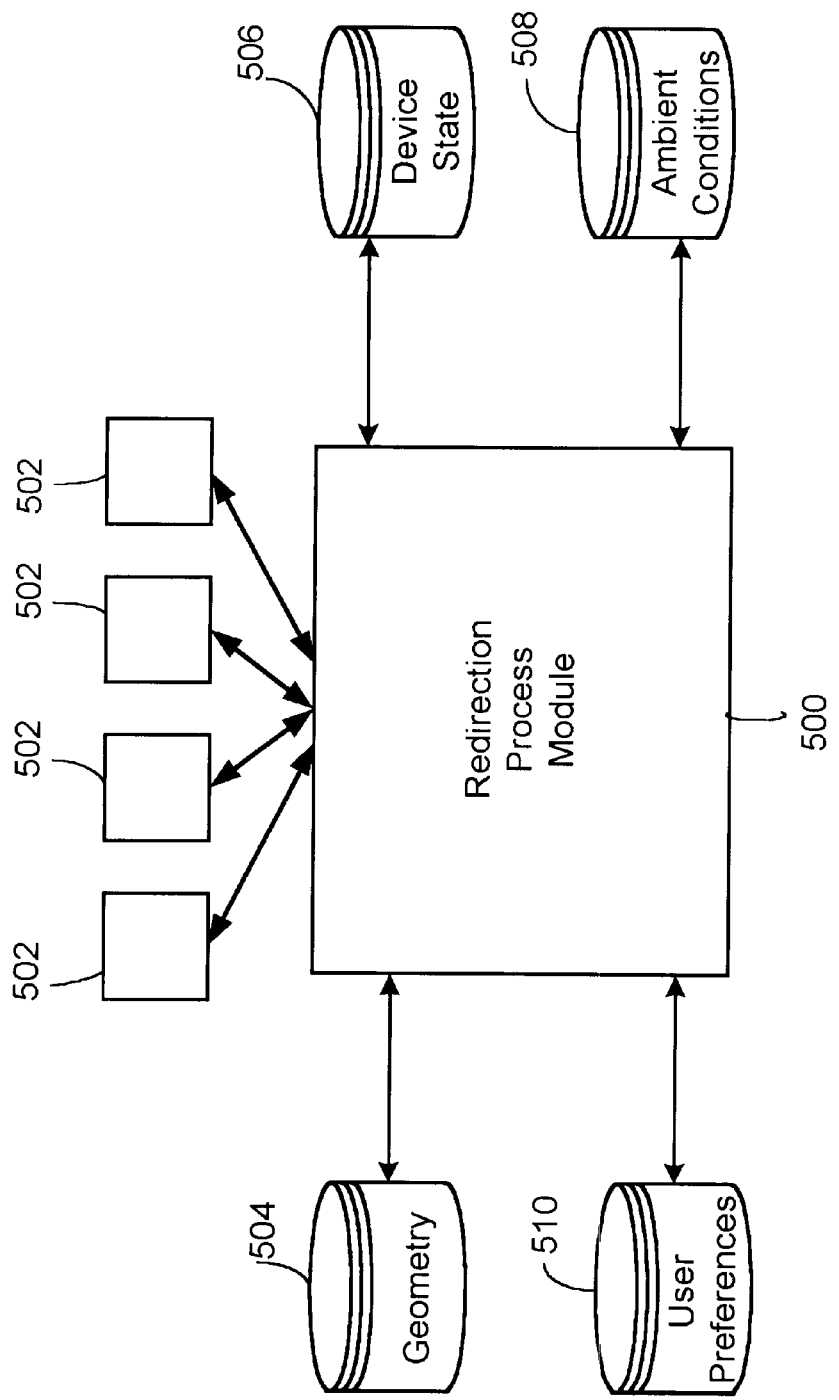
FIG. 5 is a diagram depicting a redirection process module that takes inputs from various databases, evaluates preconditions for initiating and terminating association between input devices and computers in a computing space, and directs the computer to make or break associations accordingly.

Given the previously-described computing space architecture for redirecting input device signal and the established sets of initiating and terminating preconditions for associating various input devices to computers in the space, there needs to be a vehicle for automatically making and breaking associations between these input devices and the computers based on the preconditions, as indicated in the process flow outlined in FIGS. 3 and 4. This is preferably accomplished using a single instance of a redirection process that takes input from various databases, evaluates initiating and terminating preconditions, and controls the associations between input devices and the computers in the computing space. This process can be embodied in a program running on a separate computer, or one or more of the computers for which associations are to be made. More particularly, referring to FIG. 5, a redirection process module 500 is in communication with the computers 502 present in the computing space. This redirection process module 500 may, e.g., correspond to the aforementioned Input Router Program of the tested embodiments. While the preferred embodiment uses only a single Input Router Program, multiple such programs could be employed. The redirection process module 500 has access to information concerning the space from one or more databases. Four such databases 504, 506, 508, 510 are shown in FIG. 5. The first of these databases 504 contains information concerning the geometry of the space. Specifically, the geometry database 504 contains information concerning at least the location of each input device, computer and display device in the space, for which the associations are to be controlled. It is noted that this database could contain much more information than just raw location data. This possibility will be discussed in detail later in this description. Another of the envisioned databases 506 contains information concerning the state of the devices in the computing space. Essentially, this database 506 provides the data used to determine whether a device involved in a possible association is in the ready state as discussed previously. Database 508 is used to store information concerning the ambient conditions in the environment that is relevant to specific preconditions established for determining whether to associate an input device with a computer in the space. For example, the current illumination conditions of the space could be stored in this database 508. Also, it is envision that the redirection process module have access to a database 510 containing a current set of user preferences. This information would be used to evaluate the previously described preconditions established to ensure the user can tailor whether an association is to be made or not between an input device and a computer in the computing space. Finally, this redirection process would also have access to events generated by user interfaces, thus supporting direct user commands of the redirection process.

It is noted that one thing the foregoing databases 504, 506, 508, 510 have in common is that they contain information that is likely to change, (i.e., geometry, device state and ambient conditions), or that is desired to leave open for change (i.e., user preferences). Other information that is more static in nature could reside in the redirection process module 500 itself. For example, information concerning prescribed device preferences could be made a part of the module 500. In addition, since it is the redirection process module 500 that will effectuate associations between input devices and computers in the computing space, information as to what associations have been initiated or terminated can be maintained by the module itself. Thus, preconditions dependent on pre-existing associations can be evaluated directly by the module 500 without input from an outside database.

It is further noted that the data pathway between the redirection process module 500 and the various databases 504, 506, 508, 510 can be two-way as indicated by the double-headed arrows in FIG. 5. In this way, data can be periodically fed to the module 500 from the databases 504, 506, 508, 510 in a number of ways. For example, each database 504, 506, 508, 510 could be tasked with providing the data to the module 500 on a set schedule or whenever some aspect of the data stored in the database changes. Alternately, the module 500 could be required to request data from the databases 504, 506, 508, 510 on some set schedule. This feature will be discussed in more detail in connection with a description of the geometry database 504. Also, note that two-way communication between the redirection process module 500 and the various computers 502 in the computing space is possible as indicated by the two-way arrows in FIG. 5 between these elements. The communication link from the computers 502 to the module makes it possible to implement the previously-described feature by which a user's manipulation of an input device or user interface can initiate or terminate an association based on the existence of an appropriate precondition. Essentially, information concerning whether the user has used an input device or other user interface in the prescribed way to initiate or terminate an association is fed from the computers 502 in the computing space to the redirection process module 500.

The databases may be maintained by outside programs. In regard to the ambient condition database 508, any conventional program having this capability may be employed. Typically, such programs obtain the information about the current ambient conditions using sensors place in the computing space. Similarly, the program that maintains the user preference database 510 can be any conventional program designed for this purpose. Typically, such programs involve the use of a user interface which prompts the user to input information, which in this case would be association preferences. The current user inputs would then be store in the database 510. As for the device state database 506, it is envisioned that the computers in the computing space (and perhaps the input and display devices themselves) would be required to report their state to the database for access by the redirection process module 500.

In regard to the geometry database 504, more than one possibility exists on how it could be maintained. For example, geometric information about the position of the input devices, computer and display devices in the computing space could come from sensors installed within or on the units themselves, or from sensors existing outside the units but which provide location information concerning the units. The sensors would preferably feed data to a conventional program that would analyze it and store information concerning at least the locations of the applicable units in the space, and possibly the orientation of the units when applicable (i.e., for service region purposes), in the geometry database 504. This data may be used by the redirection process module 500 to determine whether the previously-described preconditions involving the proximity of the input devices to the various computers or display devices were satisfied. Further, when orientation information is available, the redirection process module 500 can evaluate in conjunction with a knowledge of the service regions associated with the various devices (which is stored in the redirection process module itself) to determine whether the previously described preconditions involving the confluence of service regions have been satisfied. In addition, the location of any intervening structures or objects, and even the location of other similar devices in the vicinity could be provided by the sensors and stored in the geometry database 504. This data could be used by the redirection process module 500 to determine if the aforementioned preconditions involving the existence of a clear line of site between the devices, or whether there other devices should take precedence, have been satisfied.

Another type of database that could be employed as the geometry database 504 involves the use of a geometric model. The geometric model is preferably an independent program that is designed to track and model the geometric relationships between objects of interest in the ubiquitous computing environment such as the computing space applicable to the present invention. One particularly suitable geometric model program is described in a co-pending application entitled "Geometric Model Database For Use In Ubiquitous Computing" by the some of the inventors of this application and assigned to a common assignee. The co-pending application was filed on Sep. 8, 2000 and assigned Ser. No. 09/657,871. The disclosure of this co-pending application is hereby incorporated by reference. The geometric model database program described in the co-pending application has the capability to provide all the geometric and proximity information needed by the redirection process module 500 to determine whether the applicable preconditions have been satisfied. For example, the geometric model database program can provide both the position of each input device, computer and display device of interest in the computing space, as well as the convergence of their service regions (if any). In addition, the geometric model database program can provide line of site information and the whereabouts of other devices in the vicinity. Thus, for example, the module 500 could make a query to the geometric model database program about whether an input device and display device are within each other's service region, and whether there is a clear line of sight between them, in an attempt to determine whether preconditions requiring this have been satisfied. In such a case, the module 500 would periodically make this query. Alternately, it is noted that the aforementioned geometric model database program also has the capability of handling standing queries. As such the module 500 could request that it be informed whenever a particular event occurs, rather than making periodic queries. For example, the module 500 could request that it be informed whenever an input device and display device come within each other's service regions. The geometric model database program would then provide the information as appropriate. It is further noted that the module 500 need not rely of the geometric model database program to perform the calculation necessary to determine needed relational information. For example, suppose the module 500 needed to determine whether the service regions of an input and display device are overlapping. The module 500 could simply request the position and orientation of the two devices, which it would then use in conjunction with a resident knowledge of the service regions of the devices, to compute if any overlap exists.

Figure 6:
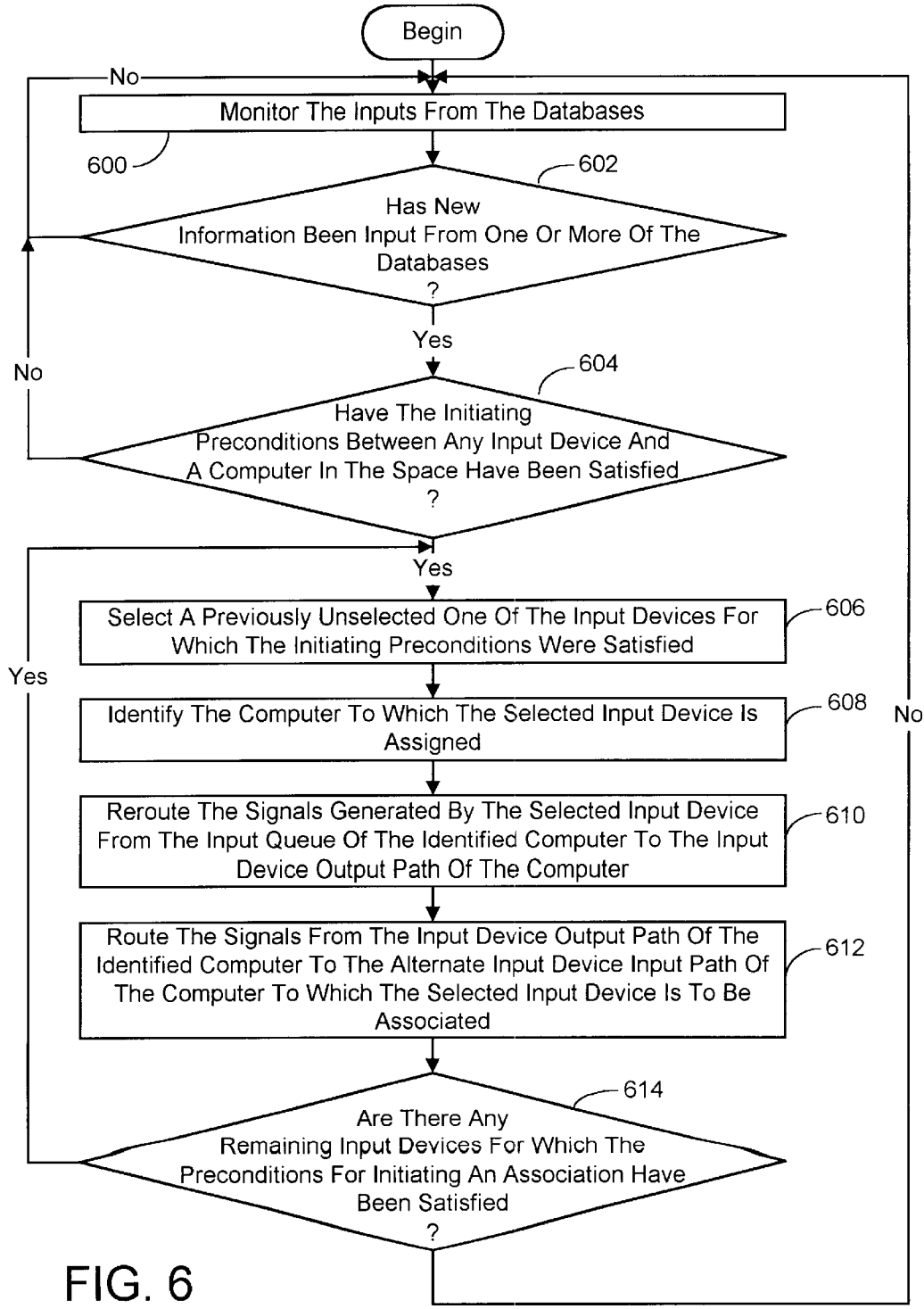
FIG. 6 is a flow chart diagramming a process for initiating associations between input devices and computers in a computing space that implements the overall process of FIG. 3.

In operation, the redirection process module performs as follows. Referring to the flow outline of FIG. 6, the inputs from the databases to the redirection process module are monitored (process action 600). During the monitoring, it is determined whether new information has been input to the module from one or more of the databases (process action 602). This information could have been requested by the module, or it could have been provided by the databases on their own initiative as discussed previously. If no information has been received, the monitoring continues. However, if information has been input, the module determines whether the preconditions for initiating an association between any input device and a computer in the computing space have been satisfied based on the information then available to the module, as indicated by process action 604. If the initiating preconditions associated the input devices in the space are not satisfied, then the monitoring continues. However, whenever it is determined that the preconditions for initiating an association between at least one input device and a computer in the space has been satisfied, a first one of these input devices (and maybe the only one) is selected (process action 606). The module then identifies the computer to which the selected input device is assigned (process action 608) and causes the signals generated by the selected input device to be rerouted from the input queue of that computer to the appropriate input device output path of the computer (process action 610). In addition, the module causes the signals now emanating from the input device output path of the aforementioned computer to be routed to the alternate input path of the computer to which the input device is to be associated (process action 612). The signals are then routed by the second computer to its input queue, as described previously in connection with FIG. 2. It is then determined whether there are any remaining input devices for which the preconditions for initiating an association between the input device and a computer in the computing space have been satisfied (process action 614). If so, process actions 606 through 614 are repeated, until there are no remaining input devices to associate. Otherwise the monitoring continues.

Figure 7:
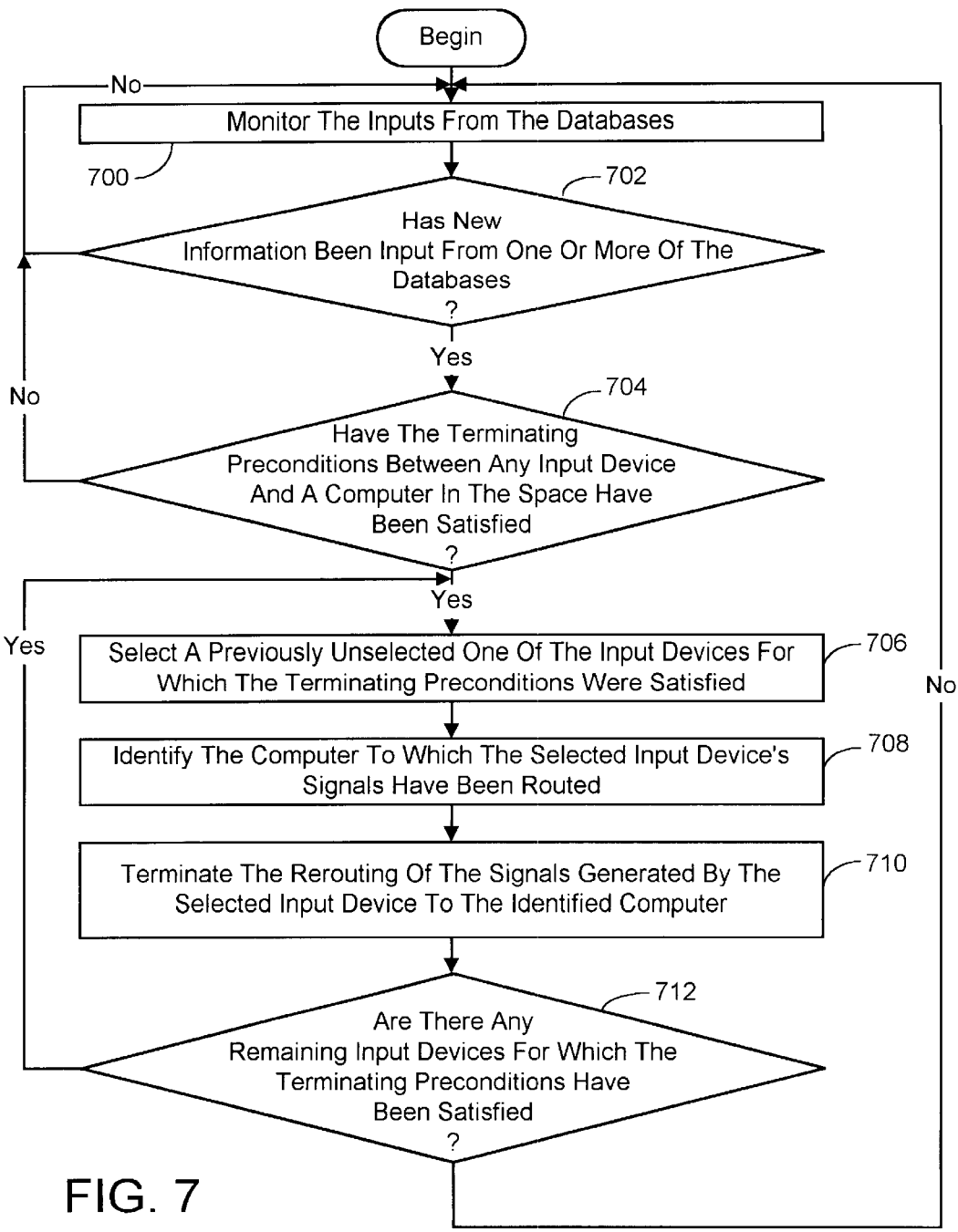
FIG. 7 is a flow chart diagramming a process for terminating existing associations between input devices and computers in a computing space that implements the overall process of FIG. 4.

Referring now to FIG. 7, the redirection process module also monitors the inputs from the databases (process action 700) to determine whether new information has been input to the module from one or more of the databases (process action 702). If information is received, the module determines whether the preconditions for terminating any already existing association between any input device and a computer in the computing space have been satisfied (process action 704). If the terminating preconditions associated the input devices in the space are not satisfied, then the monitoring continues. However, whenever it is determined that the preconditions for terminating an existing association between any input device and a computer in the space has been satisfied, a first one of these input devices (and maybe the only one) is selected (process action 706). The module then identifies the computer to which the selected input device's signals have been routed (process action 708) and terminates the routing of these signals to that computer (process action 710). It is then determined whether there are any remaining input devices for which the preconditions for terminating an association between the input device and a computer in the computing space have been satisfied (process action 712). If so, process actions 706 through 712 are repeated, until there are no remaining input devices to select. Otherwise the monitoring continues.

While the invention has been described in detail by specific reference to preferred embodiments thereof, it is understood that variations and modifications thereof may be made without departing from the true spirit and scope of the invention. For example, the foregoing description mentioned that a set of one or more initiating preconditions and a set of one or more terminating preconditions were established to automatically effect associations between a type or class of input devices (e.g., all wireless keyboards) and the computers resident in the computing space. However, while being a somewhat more limited embodiment of the invention, it is possible to establish initiating and terminating preconditions for a specific input device. For instance, a user may want to redirect a specific one of his or her input devices differently from other devices of its kind.

Wherefore, what is claimed is:

1. A computer-implemented process for redirecting signals generated by a computer input device from one computing device in a computing space to another computing device in the space, said process comprising using a computer to perform, for each different type of input device whose signals are to be redirected, the following process actions:

establishing a set of one or more initiating preconditions specifying the circumstances under which the signals generated by the type of input device under consideration are to be redirected from said one computing device to said other computing device in the computing space, said set of one or more initiating preconditions comprising a precondition that the input device must not be of a particular configuration whose signals are incompatible for input to said computing device;

determining if the one or more initiating preconditions have been satisfied for any input device of the type under consideration; and whenever said one or more initiating preconditions are satisfied for an input device of the type under consideration, redirecting the signals generated by the input device from said one computing device to said other computing device.

2. The process of claim 1, further comprising for each different type of computing input device, the process actions of:

establishing a set of one or more terminating preconditions specifying the circumstances under which signals generated by an input device of the type under consideration which were previously redirected from said one computing device to said other computing device are no longer to be so redirected;

determining if the one or more terminating preconditions have been satisfied for any input device of the type under consideration; and no longer redirecting signals generated by an input device of the type under consideration which were previously redirected from said one computing device to said other computing device whenever said one or more terminating preconditions are satisfied for that input device.

3. The process of claim 1, wherein the process action of establishing a set of one or more initiating preconditions comprises an action of including in the set a precondition that an input device of the type under consideration is within a prescribed distance from said other computing device.

4. The process of claim 1, wherein the process action of establishing a set of one or more initiating preconditions comprises an action of including in the set a precondition that an input device of the type under consideration is within a prescribed distance from a display device which is in communication with said other computing device.

5. The process of claim 1, wherein the process action of establishing a set of one or more initiating preconditions comprises an action of including in the set a precondition that the line of sight between the input device and a display device which is in communication with said other computing device be unobstructed to the degree that a person using the input device can see the display device.

6. The process of claim 3, wherein the process action of establishing a set of one or more initiating preconditions comprises an action of including in the set a precondition that no computing device in the computing space is closer to the input device than said other computing device.

7. The process of claim 4, wherein the process action of establishing a set of one or more initiating preconditions comprises an action of including in the set a precondition that no display device in the computing space is closer to the input device than said display device which is in communication with said other computing device.

8. The process of claim 1, further comprising a process action of defining an initiating service region for an input device of the type under consideration, wherein said input device service region identifies an area adjacent the input device in which the input device is capable of operating, and wherein the process action of establishing a set of one or more initiating preconditions comprises an action of including in the set a precondition that said other computing device be located within the service region defined for the input device.

9. The process of claim 1, further comprising process actions of defining an initiating service region for an input device of the type under consideration wherein said input device service region identifies an area adjacent the input device in which the input device is capable of operating, and defining an initiating service region for a display device which is in communication with said other computing device wherein the display device service region identifies an area adjacent the display device in which a display screen of the display device can be seen by a person present in the computing space, and wherein the process action of establishing a set of one or more initiating preconditions comprises an action of including in the set a precondition that the input device and the display device be within each other's service regions.

10. The process of claim 1, wherein the process action of establishing a set of one or more initiating preconditions comprises an action of including in the set a precondition that at least one ambient condition in the computing space fall within a prescribed range.

11. The process of claim 10, wherein the process action of including in the set a precondition that at least one ambient condition in the computing space fall within a prescribed range comprises a precondition that the illumination within the space exceed a level that would allow a person in the space to see and operate the input device.

12. The process of claim 1, wherein the process action of establishing a set of one or more initiating preconditions comprises an action of including in the set a precondition that the input device of the type under consideration be in a ready state, said ready state comprising the ability for the input device to generate said signals.

13. The process of claim 1, wherein the process action of establishing a set of one or more initiating preconditions comprises an action of including in the set a precondition that said other computing device be in a ready state, said ready state comprising the ability for the other computing device to receive said input device signals.

14. The process of claim 1, wherein the process action of establishing a set of one or more initiating preconditions comprises an action of including in the set a precondition that a display device which is in communication with said other computing device be in a ready state, said ready state comprising the ability of the display device to display text and images in response to a user manipulation of the input device.

15. The process of claim 1, wherein the process action of establishing a set of one or more initiating preconditions comprises an action of including in the set a precondition that no other input device of the type under consideration can have its signals redirected to said other computing device.

16. The process of claim 1, wherein the process action of establishing a set of one or more initiating preconditions comprises an action of including in the set a precondition specified by a user.

17. The process of claim 1, wherein the process action of establishing a set of one or more initiating preconditions comprises an action of including in the set a precondition that a user makes a prescribed selection via an input device or another type of user interface.

18. The process of claim 1, wherein the process action of establishing a set of one or more initiating preconditions comprises an action of establishing a single precondition the satisfaction of which results in the input device signals being redirected from said one computing device to said other computing device.

19. The process of claim 1, wherein the process action of establishing a set of one or more initiating preconditions comprises an action of establishing a plurality of preconditions, said preconditions being related by a combination of logical connectors comprising AND, OR, EXCLUSIVE OR, and NOT logical operators.

20. The process of claim 2, wherein the process action of establishing a set of one or more terminating preconditions comprises an action of including in the set a precondition that the input device exceeds a prescribed maximum distance from said other computing device.

21. The process of claim 2, wherein the process action of establishing a set of one or more terminating preconditions comprises an action of including in the set a precondition that the input device exceeds a prescribed maximum distance from a display device which is in communication with said other computing device.

22. The process of claim 2, wherein the process action of establishing a set of one or more terminating preconditions comprises an action of including in the set a precondition that the line of sight between the input device and a display device which is in communication with said other computing device is blocked such that a person using the input device cannot see the display device.

23. The process of claim 2, wherein the process action of establishing a set of one or more terminating preconditions comprises an action of including in the set a precondition that a different computing device in the computing space is closer to the input device than said other computing device.

24. The process of claim 2, wherein the process action of establishing a set of one or more terminating preconditions comprises an action of including in the set a precondition that a display device other than the one in communication with said other computing device is closer to the input device than said other display device.

25. The process of claim 2, further comprising a process action of defining a terminating service region for an input device, wherein said input device service region identifies an area adjacent the input device in which the input device is capable of operating, and wherein the process action of establishing a set of one or more terminating preconditions comprises an action of including in the set a precondition that said other computing device is located outside the service region defined for the input device.

26. The process of claim 2, further comprising process actions of defining a terminating service region for an input device wherein said input device service region identifies an area adjacent the input device in which the input device is capable of operating, and defining a terminating service region for a display device which is in communication with said other computing device wherein the display device service region identifies an area adjacent the display device in which a display screen of the display device can be seen by a person present in the computing space, and wherein the process action of establishing a set of one or more terminating preconditions comprises an action of including in the set a precondition that the input device and the display device are not within each others service regions.

27. The process of claim 2, wherein the process action of establishing a set of one or more terminating preconditions comprises an action of including in the set a precondition that one or more of the ambient condition in the computing space exceed a prescribed range.

28. The process of claim 27, wherein the process action of including in the set a precondition that one or more of the ambient conditions in the computing space exceed a prescribed range comprises a precondition that the illumination in the space falls below a level that would allow a person in the space to see and operate the input device.

29. The process of claim 2, wherein the process action of establishing a set of one or more terminating preconditions comprises an action of including in the set a precondition that the input device is not in a ready state, said ready state comprising the ability for the input device to generate said signals.

30. The process of claim 2, wherein the process action of establishing a set of one or more terminating preconditions comprises an action of including in the set a precondition that said other computing device is not in a ready state, said ready state comprising the ability for the other computing device to receive said input device signals.

31. The process of claim 2, wherein the process action of establishing a set of one or more terminating preconditions comprises an action of including in the set a precondition that a display device which is in communication with said other computing device is not in a ready state, said ready state comprising the ability of the display device to display text and images in response to a user manipulation of the input device.

32. The process of claim 2, wherein the process action of establishing a set of one or more terminating preconditions comprises an action of including in the set a precondition that a user makes a prescribed selection via an input device or another type of user interface.

33. The process of claim 2, wherein the process action of establishing a set of one or more terminating preconditions comprises an action of establishing a single precondition the satisfaction of which results in the input device signals no longer being redirected from said one computing device to said other computing device.

34. The process of claim 2, wherein the process action of establishing a set of one or more terminating preconditions comprises an action of establishing a plurality of preconditions, said preconditions being related by a combination of logical connectors comprising AND, OR, EXCLUSIVE OR, and NOT logical operators.

35. The process of claim 2, wherein the process action of establishing a set of one or more terminating preconditions comprises an action of including in the set a precondition that another input device of the type under consideration has its signals redirected to said other computing device.

36. The process of claim 2, wherein the process action of establishing a set of one or more terminating preconditions comprises an action of including in the set a precondition specified by a user.

37. The process of claim 2, wherein the process actions of determining if the initiating and terminating preconditions have been satisfied comprises an action of inputting information needed to ascertain whether the preconditions have been satisfied from one or more databases.

38. The process of claim 37, wherein each database is maintained so as to reflect the most current information available.

39. The process of claim 37, wherein said one or more databases include a geometry database comprising information concerning the geometry of the computing space and the locations in the computing space of the input devices and computing devices, as well as any display devices which are in communication with ones of the computing devices.

40. The process of claim 37, wherein said one or more databases include a device state database comprising information concerning the readiness of the input devices and computing devices, as well as any display devices which are in communication with ones of the computing devices, wherein the readiness of an input device refers to whether it is currently able to generate signals, and wherein the readiness of a computing device refers to whether it is currently able to receive signals generated by an input device, and wherein the readiness of a display device refers to its ability to display text and images.

41. The process of claim 37, wherein said one or more databases include an ambient conditions database comprising information concerning the ambient conditions in the computing space that are relevant to previously defined initiating and terminating preconditions.

42. The process of claim 37, wherein said one or more databases include a user preference database comprising information concerning the current user preferences that are relevant to previously defined initiating and terminating preconditions.

43. The process of claim 37, wherein the process action of inputting information comprises an action of receiving said information which is periodically output by each database.

44. The process of claim 43, wherein said information is output by each database on a prescribed schedule.

45. The process of claim 43, wherein said information is output by each database whenever new or updated information is obtained by the database.

46. The process of claim 37, wherein the process action of inputting information comprises an action of requesting said information from each database on a periodic basis and inputting the response.

47. A system for redirecting signals generated by computer input devices from an assigned computing device in a computing space to another computing device in the space, said system comprising:
   a plurality of general purpose computing devices;
   an input device which has been assigned to one of the plurality of computing devices, said assignment resulting in the signals generated by the input device being nominally routed to an input queue of the assignee computing device to which the input device has been assigned;
   a source associated with the assignee computing device, said source providing an alternate path for the input device signals to take out of the assignee computing device which by-passes the input queue of the assignee computing device;
   a sink associated with the at least one computing device other than the assignee computing device, said input path being capable of inputting into the computing device input device signals that are output from the source of the assignee computing device; and
   a computer program for redirecting the input device signals comprising program modules executable by at least one of the plurality of computing devices, wherein the at least one computing device is directed by the program modules of the computer program to,
      determine whether a set of one or more initiating preconditions for rerouting the input device signals from the assignee computing device to another of the computing devices are satisfied, and
      whenever said set of one or more initiating preconditions is satisfied,
         rerouting the input device signals from the input queue of the assignee computing device to the input device output path thereof instead, and
         routing the input device signals from the source of the assignee computing device to said sink of said other computing device, said input device signal thereafter being routed by said other computing device to an input queue thereof.

48. The system of claim 47, wherein the input device signals are routed to the assignee computing device via a standard input device input path.

49. The system of claim 48, wherein the standard input device input path comprises a wired connection between the input device and the assignee computing device.

50. The system of claim 48, wherein the standard input device input path comprises a wireless connection between the input device and the assignee computing device.

51. The system of claim 47, wherein the plurality of general purpose computing devices are in communication with each other over a network and wherein the program module for routing the input device signal from source of the assignee computing device to sink of said other computing device comprises a sub-module for routing the input device signals over said network.

52. The system of claim 47, further comprising display devices, each of which is responsive to a separate one of the plurality computing devices, and wherein a display device which is responsive to a computing device to which said input device signals have been redirected from an assignee computing device, is effected by said signals in the same way signals from an input device assigned to the computing device would effect the display.

53. The system of claim 47, further comprising at least one additional input device, each of which is assigned to one of the plurality of computing devices.

54. The system of claim 53, wherein more than one input device can be assigned to one of the computing devices, said system further comprising at least one additional source associated with each assignee computing device having more than one input device assigned thereto.

55. The system of claim 54, further comprising at least one additional sink associated with each computing device having sinks, and wherein the computer program further comprises program modules for routing the signals of more than one input device from the output paths of one or more assignee computing devices to a one of the computing devices having sinks, wherein each input device's signals are routed to a separate one of the sinks associated with said computing device.

56. The system of claim 55, wherein the multiple input device signals routed to separate ones of the sinks associated with said one of the computing devices originated from a different types of input devices.

57. The system of claim 54, wherein the computer program further comprises program modules for respectively routing the signals of more than one input device from the output paths of one or more assignee computing devices to the same sink of another of the computing devices.

58. The system of claim 57, wherein the input device signals routed to the same sink of said other computing device originated from the same type of input device.

59. A computer-readable medium having computer-executable instructions for redirecting signals generated by a computer input device from one computing device in a computing space to another computing device in the space, said computer-executable instructions comprising, for each different type of input device whose signals are to be redirected:

establishing a set of one or more initiating preconditions specifying the circumstances under which an input device of the type under consideration is to be associated with said other computing device, wherein said association results in the signals generated by such an input device being redirected from said one computing device to said other computing device, and wherein said set of one or more initiating preconditions comprises a precondition that the input device must not be of a particular configuration whose signals are incompatible for input to said computing device;

determining if the initiating preconditions have been satisfied for any input device of the type under consideration; and whenever the initiating preconditions are satisfied for an input device of the type under consideration, associating that input device with said other computing device.

60. The computer-readable medium of claim 59, further comprising computer-executable instructions for:

establishing a set of one or more terminating preconditions specifying the circumstances under which a previous association between an input device and said other computing device should be terminated such that the signals generated by such an input device which were previously redirected from said one computing device to said other computing device are no longer so redirected;

determining if the terminating preconditions have been satisfied for any input device of the type under consideration; and whenever the terminating preconditions are satisfied for an input device of the type under consideration, terminating the association between that input device and said other computing device.

61. The computer-readable medium of claim 60, further comprising a computer-executable instruction for defining an initiating service region for an input device of the type under consideration, and wherein the instruction for establishing a set of one or more initiating preconditions comprises a sub-module for including in the set a precondition that said other computing device be located within the service region defined for the input device.

62. The computer-readable medium of claim 61, further comprising a computer-executable instruction for defining a terminating service region for the input device, and wherein the instruction for establishing a set of one or more terminating preconditions comprises a sub-module for including in the set a precondition that said other computing device is located outside the service region defined for the input device.

63. The computer-readable medium of claim 62, wherein the size of the initiating service region defined for the input device is not the same as the size of the terminating service region defined for the input device.

64. The computer-readable medium of claim 63, wherein the terminating service region of the input device is larger than its initiating service region.

65. The computer-readable medium of claim 60, further comprising computer-executable instructions for defining an initiating service region for an input device of the type under consideration, and defining an initiating service region for a display device which is in communication with said other computing device, and wherein the instruction for establishing a set of one or more initiating preconditions comprises a sub-module for including in the set a precondition that the input device and the display device be within each other's service regions.

66. The computer-readable medium of claim 65, further comprising a computer-executable instruction for defining a terminating service region for the input device, and defining a terminating service region for a display device which is in communication with said other computing device, and wherein the instruction for establishing a set of one or more terminating preconditions comprises a sub-module for including in the set a precondition that the input device and the display device are not within each others service regions.

67. The computer-readable medium of claim 66, wherein the size of the initiating service region defined for the input device is not the same as the size of the terminating service region defined for the input device.

68. The computer-readable medium of claim 67, wherein the terminating service region of the input device is larger than its initiating service region.

69. The computer-readable medium of claim 66, wherein the size of the initiating service region defined for the display device is not the same as the size of the terminating service region defined for the display device.

70. The computer-readable medium of claim 69, wherein the terminating service region of the display device is larger than its initiating service region.

71. A system for redirecting signals generated by computer input devices from an assigned computing device in a computing space to another computing device in the space, said system comprising:

a plurality of general purpose computing devices;

an input device which has been assigned to one of the plurality of computing devices, said assignment resulting in the signals generated by the input device being normally routed to an input queue of the assignee computing device to which the input device has been assigned;

an input device output path associated with the assignee computing device, said input device output path providing an alternate path for the input device signals to take out of the assignee computing device which by-passes the input queue of the assignee computing device;

an alternate input device input path associated with the at least one computing device other than the assignee computing device, said input path being capable of inputting into the computing device input device signals that are output from the input device output path of the assignee computing device;

an input router computer program for redirecting the input device signals comprising program modules executable by at least one of the plurality of computing devices, wherein the at least one computing device is directed by the program modules of the computer program to, determine whether a set of one or more initiating preconditions for rerouting the input device signals from the assignee computing device to another of the computing devices are satisfied, whenever said set of one or more initiating preconditions is not satisfied, directing that the input signals be routed to the input queue of the assignee computing device, and whenever said set of one or more initiating preconditions is satisfied, directing that the input signals be rerouted from the input queue of the assignee computing device to the input device output path thereof instead, and directing that the input device signals be routed from the output path of the assignee computing device to said alternate input path of said other computing device, said input device signal thereafter being routed by said other computing device to an input queue thereof, and directing that the input device signals routed to the alternate input path of the other computing device be routed to an input queue of the other computing device.

72. The system of claim 71, further comprising a source computer program resident on each assignee computing device for intercepting and routing the input device signals of input devices assigned to an assignee computing device comprising program modules executable by said assignee computing device, wherein the assignee computing device is directed by the program modules of the source computer program to:

intercept the input device signals;

route the intercepted signals to the input queue of the assignee computing device whenever directed to do so by the input router computer program; and route the intercepted signals to the input device output path of the assignee computing device whenever directed to do so by the input router computer program.

73. The system of claim 72, further comprising a sink computer program resident on each of said other computing devices for inputting and routing the input device signals redirected from an assignee computing device to the other computing device comprising program modules executable by said other computing device, wherein the other computing device is directed by the program modules of the sink computer program to:

input the redirected input device signals; and route the input device signals to the input queue of the other computing device.

74. A computer-implemented process for redirecting signals generated by a computer input device from one computing device in a computing space to another computing device in the space, said process comprising using a computer to perform the following process actions:

establishing a set of one or more initiating preconditions specifying the circumstances under which the signals generated by the input device are to be redirected from said one computing device to said other computing device in the computing space, said set of one or more initiating preconditions comprising a precondition that the input device must not be of a particular configuration whose signals are incompatible for input to said computing device;

determining if said one or more initiating preconditions have been satisfied; and whenever said one or more initiating preconditions are satisfied, redirecting the signals generated by the input device from said one computing device to said other computing device.

75. The process of claim 74, further comprising the process actions of:

establishing a set of one or more terminating preconditions specifying the circumstances under which signals generated by the input device which were previously redirected from said one computing device to said other computing device are no longer to be so redirected;

determining if said one or more terminating preconditions have been satisfied; and no longer redirecting signals generated by the input device which were previously redirected from said one computing device to said other computing device whenever said one or more terminating preconditions are satisfied.

* * * * *